US012738039B2

(12) United States Patent
Lv et al.

(10) Patent No.: US 12,738,039 B2
(45) Date of Patent: Sep. 15, 2026

(54) LABEL GENERATION METHOD, IMAGE CLASSIFICATION METHOD, AND ELECTRONIC DEVICE

(71) Applicant: MaShang Consumer Finance Co., Ltd., Chongqing (CN)

(72) Inventors: Yongchun Lv, Chongqing (CN); Hui Zhu, Chongqing (CN); Xunyi Zhou, Chongqing (CN); Ning Jiang, Chongqing (CN); Haiying Wu, Chongqing (CN)

(73) Assignee: MaShang Consumer Finance Co., Ltd., Chongqing (CN)

( * ) Notice: Subject to any disclaimer, the term of this patent is extended or adjusted under 35 U.S.C. 154(b) by 380 days.

(21) Appl. No.: 18/616,463

(22) Filed: Mar. 26, 2024

(65) Prior Publication Data

US 2024/0233348 A1 Jul. 11, 2024

Related U.S. Application Data

(63) Continuation-in-part of application No. PCT/CN2023/102477, filed on Jun. 26, 2023.

(30) Foreign Application Priority Data

Jul. 20, 2022 (CN) ......................... 202210857077.5

(51) Int. Cl.
*G06V 10/778* (2022.01)
*G06V 10/764* (2022.01)
*G06V 20/70* (2022.01)

(52) U.S. Cl.
CPC .......... *G06V 10/778* (2022.01); *G06V 10/764* (2022.01); *G06V 20/70* (2022.01)

(58) Field of Classification Search
CPC .... G06V 10/778; G06V 10/764; G06V 20/70; G06V 10/7753; G06V 10/776;
(Continued)

(56) References Cited

U.S. PATENT DOCUMENTS 10,558,920 B2 * 2/2020 Jayaraman ............. G06N 5/022
11,961,281 B1 * 4/2024 Kim ....................... G06V 20/64
(Continued)

FOREIGN PATENT DOCUMENTS

CN 114445670 7/2022

OTHER PUBLICATIONS

Zhang B, Wang Y, Hou W, Wu H, Wang J, Okumura M, Shinozaki T. Flexmatch: Boosting semi-supervised learning with curriculum pseudo labeling. Advances in neural information processing systems. Dec. 6, 2021;34:18408-19.*
(Continued)

*Primary Examiner* — Xuemei G Chen
(74) *Attorney, Agent, or Firm* — Cooper Legal Group, LLC

(57) ABSTRACT

The present application discloses a label generation method including identifying an unlabeled image by a teacher model and a student model respectively to obtain first classification reference information of the teacher model and second classification reference information of the student model. A first number of detection objects of each category in the teacher model is determined according to the first classification reference information, and a second number of detection objects of each category in student model is determined according to the second classification reference information. Once a probability threshold of each category is determined according to the first number of detection objects and the second number of detection objects, a pseudo label of the unlabeled image is generated for the student model accord-
(Continued)

ing to the first classification reference information and a probability threshold of each predicted category.

13 Claims, 4 Drawing Sheets

(58) Field of Classification Search
CPC ...... G06V 10/82; G06V 10/44; G06V 10/772; G06N 3/04; G06N 3/045; G06N 3/08; G06N 3/0895; G06N 3/096
See application file for complete search history.

(56) References Cited

U.S. PATENT DOCUMENTS

| | | | | |
|---|---|---|---|---|
| 2019/0392606 | A1* | 12/2019 | Hisada | G06F 16/5854 |
| 2021/0264224 | A1* | 8/2021 | Tamaoki | G01S 13/867 |
| 2022/0188636 | A1* | 6/2022 | Pham | G06N 3/08 |
| 2022/0198181 | A1* | 6/2022 | Huang | G06N 3/0495 |
| 2022/0262031 | A1* | 8/2022 | Yamasaki | G06T 7/11 |
| 2023/0177813 | A1* | 6/2023 | Kawasaki | G06T 7/70 382/103 |
| 2023/0274448 | A1* | 8/2023 | Metge | G06T 7/248 382/103 |
| 2023/0281974 | A1* | 9/2023 | Ramamonjison | G06N 3/08 382/157 |
| 2025/0086949 | A1* | 3/2025 | Meethal | G06V 10/22 |

OTHER PUBLICATIONS

Li H, Wu Z, Shrivastava A, Davis LS. Rethinking pseudo labels for semi-supervised object detection. InProceedings of the AAAI conference on artificial intelligence Jun. 28, 2022 (vol. 36, No. 2, pp. 1314-1322).*

Chen B, Chen W, Yang S, Xuan Y, Song J, Xie D, Pu S, Song M, Zhuang Y. Label Matching Semi-Supervised Object Detection. arXiv preprint arXiv:2206.06608. Jun. 14, 2022.*

Yihe Tang et al.; Humble Teachers Teach Better Students for Semi-Supervised Object Detection;2021 IEEE/CVF Conference on Computer Vision and Pattern Recognition (CVPR);Jun. 20, 2021;pp. 3131-3140.

Qizhe Xie et al.;Self-training with Noisy Student improves ImageNet classification;2020 IEEE/CVF Conference on Computer Vision and Pattern Recognition (CVPR);Jun. 13, 2020;pp. 10684-10695.

Minchul Shin;Semi-supervised Learning with a Teacher-student Network for Generalized Attribute Prediction; arxiv.org,Cornell University Library,201 Olin Library Cornell University Ithaca, NY 14853; Jul. 14, 2020.

Amin Banitalebi-Dehkordi;Knowledge Distillation for Low-Power Object Detection: A Simple Technique and Its Extensions for Training Compact Models Using Unlabeled Data;2021 IEEE/CVF International Conference on Computer Vision Workshop (ICCVW);Oct. 11, 2021; pp. 769-778.

* cited by examiner

LABEL GENERATION METHOD, IMAGE CLASSIFICATION METHOD, AND ELECTRONIC DEVICE

CROSS REFERENCE

The present application claims priority to the Chinese patent application filed with the China National Intellectual Property Administration on Jul. 20, 2022, with application number 202210857077.5 and titled "LABEL GENERATION METHOD, METHOD FOR TRAINING IMAGE CLASSIFICATION MODEL, IMAGE CLASSIFICATION METHOD AND DEVICE". The entire content of the application is incorporated in the present application by reference.

FIELD

The present application relates to a field of an artificial intelligence technology, and in particular to a label generation method, a method for training an image classification model, an image classification method and a device.

BACKGROUND

In recent years, a deep learning technology based on a convolutional neural network has achieved a significant effect in fields such as image classification, object detection, and instance segmentation. However, a large-scale neural network relies on large-scale labeled data to drive it. In a practical application scenario, establishing a collection of large-scale annotated data suitable for a supervised learning is difficult, time-consuming, and relies on an expert experience. However, it is easy to obtain unlabeled image data, and large amounts of unlabeled images can be quickly obtained by relying on an automated computer program. A semi-supervised learning is that a deep learning model with an excellent performance can be obtained by performing a deep learning task effectively using a small number of labeled images and a large number of unlabeled images, and a problem of a lack of labeled images is effectively solved. In order to save a cost of annotating manually, the semi-supervised learning is proposed and widely studied.

DESCRIPTION OF THE DRAWINGS

The drawings described here are used to provide a further understanding of the present application and constitute a part of the present application. The illustrative embodiment of the present application and their descriptions are used to explain the present application and do not constitute an improper limitation of the present application. In the drawings.

DESCRIPTION

Figure 1:
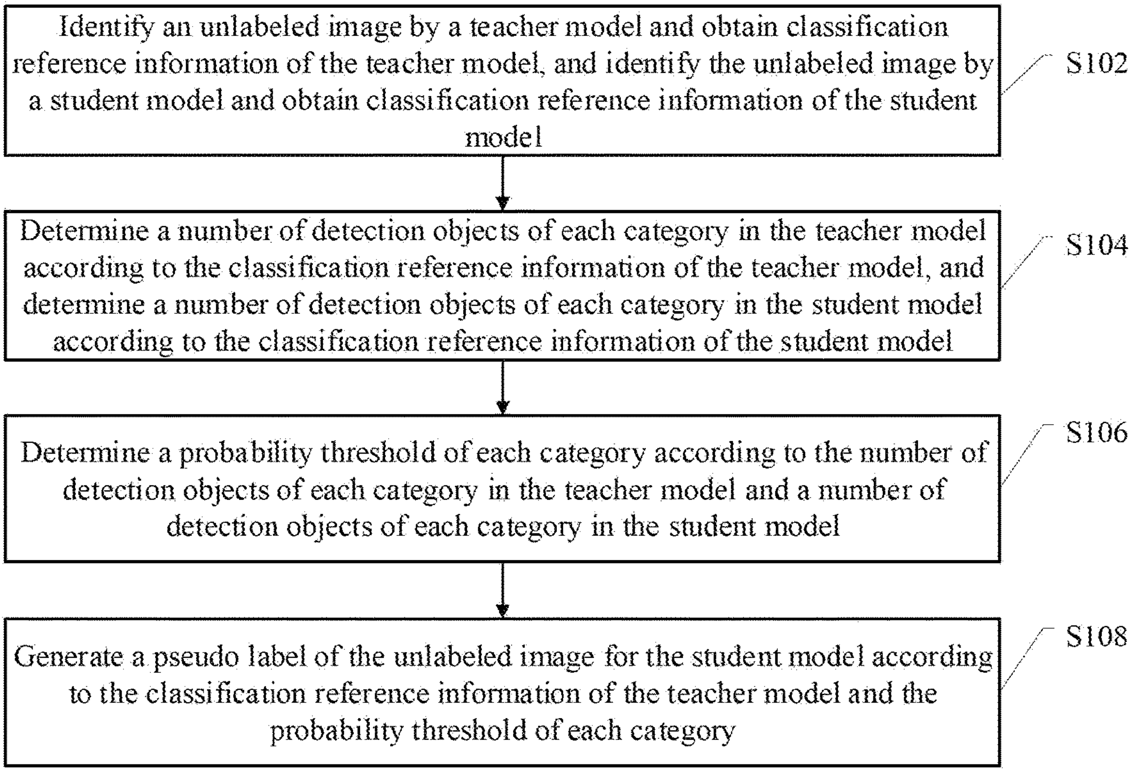
FIG. 1 is a flowchart of a label generation method provided by an embodiment of the present application.

In order to make a purpose, a technical solution and an advantage of the present application clearer, the technical solution of the present application will be clearly and completely described below in conjunction with specific embodiment of the present application and corresponding drawings. Obviously, the described embodiments are only some of embodiment of the present application, but not all of the embodiments. According to the embodiments in the present application, all other embodiments obtained by those of ordinary skill in the art without creative efforts fall within the scope of protection of the present application.

The terms "first", "second", etc. in this specification and claims are used to distinguish similar objects and are not used to describe a specific order or sequence. It is to be understood that data so used are interchangeable under appropriate circumstances so that embodiment of the present application can be practiced in sequences other than those illustrated or described herein. In addition, "and/or" in this specification and claims indicates at least one of two objects, and the character "/" generally indicates that related objects are in an "or" relationship.

In an object detection task, there is usually an imbalance between categories, and there are obvious differences in the difficulty of learning each category. This problem is more serious in the object detection task of the semi-supervised learning, and problems of confirmation bias and error accumulation are more significant. That is to say, in the object detection task of the semi-supervised learning, supervised information provided by a labeled image is insufficient, and a model tends to identify more of detection objects that are identifiable and are identified more easily, resulting in pseudo labels that are generated including more detection objects with easy categories and fewer detection objects with difficult categories, thus exacerbating a problem of imbalanced learning. This phenomenon is not conducive to a utilization of unlabeled images (a utilization of difficult category is low), which in turn leads to a poor classification result of a model that has been trained, thus affecting a classification accuracy of the model.

Through research on an existing semi-supervised object detection method, it is found that a main reason why pseudo labels that are generated including more detection objects of easy categories and fewer detection objects of difficult categories is that the existing semi-supervised object detection method does not treat the detection object of each category differently according to its learning difficulty. Instead, it uses a fixed threshold to filter out appropriate categories from a classification result obtained by the model for the unlabeled image, and uses this to generate the pseudo label, which leads to detection objects with difficult categories are heavily filtered, making the model tend to identify more of detection objects that are easy to identify.

According to this, the embodiment of the present application provides a label generation method, for the semi-supervised object detection framework including a teacher model and a student model, according to classification reference information obtained by the teacher model and the student model respectively identifying the same unlabeled image, by counting a number of detection objects of the same category for each model, the learning statuses (or learning difficulties) of the teacher model and the student model for the same category can be evaluated, thereby determining a probability threshold suitable for each category; further, using the classification reference information of the teacher model and the probability threshold of each category to generate a pseudo label of the unlabeled image for the student model, can avoid a large number of detection objects in difficult categories from being filtered and alleviate the problem of unbalanced learning of different categories by the student model, thereby improve the training effect of the image classification model with the semi-supervised object detection framework, so that the image classification model has a higher classification accuracy.

The embodiment of the present application also proposes a training method for the image classification model. For the image classification model with the semi-supervised object detection framework, the training method of the image classification model uses the student model of the image classification model to identify the labeled image and the unlabeled image in the image collection respectively, obtains the classification reference information of the labeled image and the classification reference information of the unlabeled image, and then uses the label generation method provided by the embodiment of the present application to generate the pseudo label of the unlabeled image for the student model, to provide the guidance to the learning process of the student model, and adjusts model parameters of the image classification model according to the classification reference information of each image in the image collection, the category label of the labeled image in the image collection, and the pseudo label of the unlabeled image in the image collection, to help alleviate the problem of imbalanced learning of different categories by the student model, thereby improving the training effect of the image classification model with the semi-supervised object detection framework, so that the image classification model has a higher classification accuracy.

The embodiment of the present application also proposes an image classification method, which can accurately identify images by using the image classification model obtained by training. Since the pseudo label of the unlabeled image used in the semi-supervised learning process of the image classification model is obtained by dynamically evaluating the learning status (or learning difficulty) of each category by the teacher model and the student model respectively, it is helpful to alleviate the problem of imbalanced learning of different categories of the student model, and makes the image classification model that has been trained to have a higher classification accuracy; further, using the image classification model to identify the image to be processed helps to improve the accuracy and reliability of the image classification result.

It should be understood that the label generation method, the training method of the image classification model and the image classification method provided by the embodiment of the present application can all be executed by an electronic device or a software installed in the electronic device. The electronic device here may be a terminal device, such as a smartphone, a tablet, a laptop, a desktop computer, an intelligent voice interaction device, a smart home appliance, a smart watch, a vehicle-mounted terminal, an aircraft, etc.; or, the electronic device may be a server, For example, it can be an independent physical server, a server cluster or a distributed system composed of multiple physical servers, or a cloud server that provides cloud computing services.

The technical solution provided by each embodiment of the present application will be described in detail below with reference to the accompanying drawings.

Please refer to FIG. 1, which is a schematic flow chart of a label generation method provided by an embodiment of the present application. The method is applied in a semi-supervised object detection framework. The semi-supervised object detection framework includes a teacher model and a student model. The method can include the following steps:

S102, identifying an unlabeled image by the teacher model and obtaining classification reference information of the teacher model, and identifying the unlabeled image by the student model and obtaining classification reference information of the student model.

In the embodiment of the present application, the teacher model and the student model may have the same network structure, or, in order to simplify a model structure and achieve a compression and an acceleration of an image classification model, the teacher model and the student model may also have different network structures, such as the student model adopts a more simplified structure than the teacher model.

In addition, in practical applications, the teacher model and the student model can be two independent models; alternatively, the teacher model and the student model can also be integrated into an image classification model. On this basis, a semi-supervised learning method is used to train the image classification mode, and obtain a final image classification model.

Both the teacher model and the student model can identify the unlabeled image and obtain corresponding classification reference information. That is, one classification reference information corresponds to one model of the semi-supervised object detection framework. Specifically, the teacher model can classify the unlabeled image and obtain classification reference information of the unlabeled image corresponding to the teacher model; the student model can identify the unlabeled image and obtain classification reference information of the unlabeled image corresponding to the student model.

Both the classification reference information of the unlabeled image corresponding to the teacher model and the classification reference information of the unlabeled image corresponding to the student model include N (N is a positive integer) detection objects included in the unlabeled image and a probability that each of the N detection objects in each of a plurality of categories. Among them, one detection object refers to a part of content presented in the unlabeled image, and the probability that each detection object in a certain category represents a probability that a certain part of the content presented in the unlabeled image in a certain category. For example, the plurality of categories include cat, dog, horse and mule. The classification reference information of the unlabeled image includes N detection objects included in the unlabeled image and the probability of each detection object of the N detection objects respectively belongs to the cat, dog, horse and mule.

Figure 2:
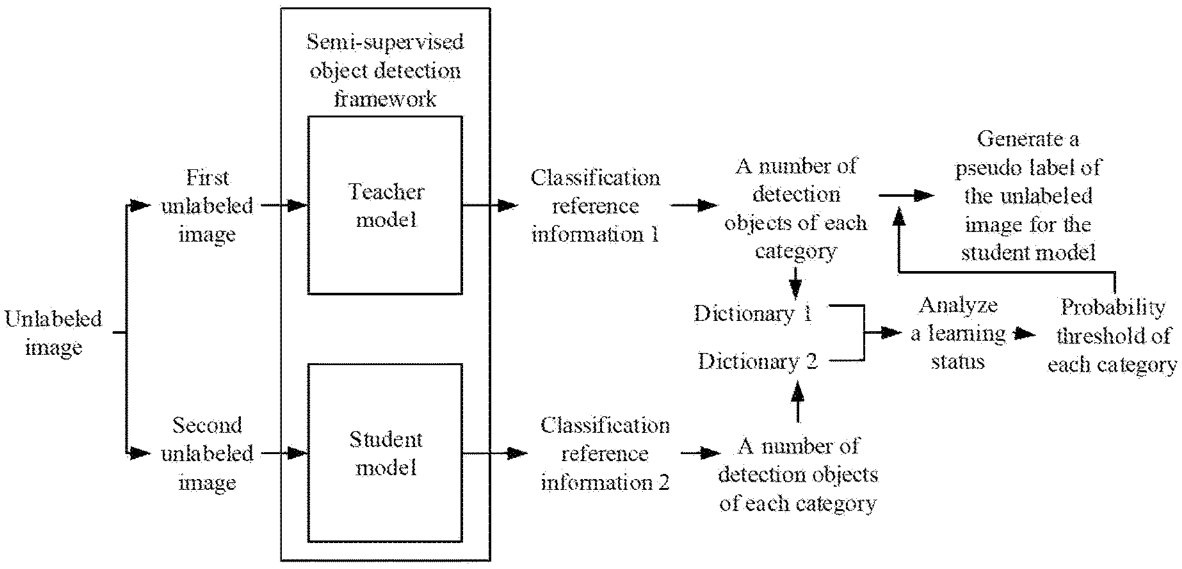
FIG. 2 is a schematic flow chart of a label generation method provided by another embodiment of the present application.

In order to enable each model of the semi-supervised object detection framework to fully understand and learn unlabeled images to improve an expression ability of each model, as shown in FIG. 2, the unlabeled image in the embodiment of the present application can be an image obtained after performing data augmentation on an initial unlabeled image, that is, before the S102, the label generation method provided by the embodiment of the present application may also include: performing data augmentation processing on the initial unlabeled image, thereby adding a perturbation to the initial unlabeled image, and obtaining the unlabeled image including the perturbation.

For the initial unlabeled image, the data augmentation processing of various augmentation levels can be performed on the initial unlabeled image to obtain a plurality of unlabeled images, where one unlabeled image corresponds to the various augmentation levels.

The performing of the data augmentation processing of various augmentation levels on the initial unlabeled image specifically can be implemented as follows: performing a weakly-augmented processing on the initial unlabeled image and obtaining a first unlabeled image, performing a strongly-augmented processing on the initial unlabeled image and obtaining a second unlabeled image. That is, the plurality of unlabeled images includes the first unlabeled image and the second unlabeled image, and an augmentation level of the first unlabeled image is smaller than the augmentation level of the second unlabeled image. For example, the weakly-augmented processing may specifically include but is not limited to at least one of the following processing methods: translation, flipping, etc. The strongly-augmented processing may include but is not limited to at least one of the following processing methods: occlusion, color transformation, random erase, etc.

In the S102, the first unlabeled image can be identified using the teacher model, and the classification reference information of the first unlabeled image corresponding to the teacher model can be obtained, the second unlabeled image can be identified using the student model and the classification reference information of the second unlabeled image corresponding to the student model can be obtained.

It can be understood that since the augmentation level of augmentation processing such as translation and flipping is small, that is, the perturbation introduced to the initial unlabeled image is small, it will not distort the first unlabeled image, making the teacher model and the student model both can learn noise in the first unlabeled image on a basis of obtaining an accurate classification and identification result, which is conducive to improving learning effects of the teacher model and the student model; in addition, considering that the teacher model and/or the student model may fall into an overfitting state and cannot extract essential features of the first unlabeled image if only weakly-enhanced image is used, the perturbation introduced by the strongly-augmented processing is large, which may bring about a distortion of the second unlabeled image, but it can still retain features that are sufficient to identify the category. After performing the weakly-augmented processing and the strongly-augmented processing on the initial unlabeled image, the teacher model identifies the first unlabeled image, and the student model identifies the second unlabeled image, which is conducive to improving the learning effects of the teacher model and the student model, and enhancing the expressive capabilities of the teacher model and the student model.

S104, determining a number of detection objects of each category in the teacher model according to the classification reference information of the teacher model, and determining a number of detection objects of each category in the student model according to the classification reference information of the student model.

In an optional implementation, the S104 may include: for the teacher model, according to the classification reference information of the teacher model, selecting a category of a maximum probability from the probability of each detection object in each category, and determining the category as a predicted category of each detection object corresponding to the teacher model, and determining the number of detection objects of each of the plurality of categories in the teacher model according to the predicted category of each detection object corresponding to the teacher model; for the student model, according to the classification reference information of the student model, selecting a category of a maximum probability from the probability of each detection object in each category, and determining the category as a predicted category of each detection object corresponding to the student model, and determining the number of detection objects of each of the plurality of categories in the student model according to the predicted category of each detection object corresponding to the student model.

For example, taking the plurality of categories including the cat, dog, horse and mule, for the classification reference information of each model, if the probabilities of a detection object in the classification reference information belongs to the cat, dog, horse and mule respectively are 0.1, 0.2, 0.6, and 0.1 in sequence. Then, it can be determined that the predicted category of the detection object corresponding to the model is the horse. By counting the predicted category of each detection object, the number of detection objects of each category is determined. For example, the predicted categories of detection objects are the horse, horse, dog, cat, and dog respectively. Then the number of detection objects of the category of horse is 2, the number of detection objects of the category of dog is 2, and the number of detection objects of the category of cat is 1.

The unlabeled image that has been identified includes at least one detection object. After determining that the predicted category of each detection object corresponds to a certain model, for each category, by counting the detection objects in that category, the number of detection objects of each category can be determined for the model. For example, the number of detection objects of each category in a certain model can be determined by the following formula (1):

$$C_i^k(x_\zeta^u) = \sum_{j=1}^{|r_i(x_\zeta^u)|} \mathbb{1}\left(r_i(x_\zeta^u)_j = k\right) \tag{1}$$

Among them, $$C_i^k(x_\zeta^u)$$

represents a number of detection objects of the k-th category in the i-th model of the semi-supervised object detection framework, $$x_\zeta^u$$

represents the unlabeled image, $$r_i(x_\zeta^u)$$

represents a collection of detection objects included in the unlabeled image detected by the i-th model, $$r_i(x_\zeta^u) = \{o_1, o_2, \ldots\}, r_i(x_\zeta^u)_j$$

represents the j-th detection object $o_j$ in the collection of detection objects, $\mathbb{1}$ represents an exponential function, which is equal to 1 if a condition in the brackets is true, $|\cdot|$ represents a cardinality.

To facilitate subsequent use, as shown in FIG. 2, for each model of the semi-supervised object detection framework, the number of detection objects of each category in the model can be recorded in a form of a dictionary, where a key of the dictionary is a category identifier (such as a category number), and a value of the dictionary represents the number of detection objects of the category in the model, thus obtaining the dictionary corresponding to the model. For example, the dictionary corresponding to the i-th model is as follows:

$$d_i^\zeta = \{1: C_i^1(x_\zeta^u), \ldots, k: C_i^k(x_\zeta^u), \ldots, z: C_i^z(x_\zeta^u)\}$$

Among them, $$d_i^\zeta$$

represents the dictionary corresponding to the i-th model of the semi-supervised object detection framework, k represents the category identifier of the k-th category, $$1 \le k \le z, C_i^k(x_\zeta^u)$$

represents the number of detection objects of the k-th category in the i-th model, and $$x_\zeta^u$$

represents the unlabeled image.

It is worth noting that the above is only illustrated with one unlabeled image, and the above dictionary $$d_i^\zeta$$

is only the dictionary corresponding to one unlabeled image for the i-th model. In the actual training process, a number of unlabeled images used is multiple. In this case, the detection objects in the same category in each unlabeled image can be counted separately to obtain the collection of detection objects of each category in the model, and then the dictionary of the model corresponding to a collection of unlabeled images can be obtained. That is, $Q_i$=

$$\sum_{x_j^u \in \mathcal{B}_u} (d_i^j)$$

representing the dictionary of the i-th model corresponding to the collection of unlabeled images, $\mathcal{B}_u$ represents the collection of unlabeled images, $$x_j^u$$

represents the j-th unlabeled image in the collection of unlabeled images, $$d_i^j$$

represents the dictionary of the i-th model corresponding to the j-th unlabeled image.

This embodiment of the present application shows a specific implementation of the S104. Of course, it should be understood that the S104 can also be implemented in other ways, and this is not limited in the embodiment of the present application.

S106, determining a probability threshold of each category according to the number of detection objects of each category in the teacher model and the number of detection objects of each category in the student model.

As shown in FIG. 2, considering that after the same image is identified by different models, the identification results obtained should be the same in theory, and the number of detection objects of the same category in different models should be the same. Therefore, a difference between the number of detection objects of each category in different models can intuitively and accurately reflect a difference in classification and identification of each category by different models, and then it can evaluate a learning status (or a learning difficulty) that the student model learns from the teacher model for each category, so that the corresponding probability threshold can be set for each category according to the learning status (or the learning difficulty) of each category, and according to the probability threshold of each category and the classification reference information obtained by the teacher model for the unlabeled image, generates a pseudo label of the unlabeled image for the student model, which can avoid a large number of detection objects in difficult categories from being filtered, which is beneficial to improve the problem of imbalanced learning of different categories by the student model, thus helping to improve the training effect of the image classification model having the semi-supervised object detection framework, and makes the image classification model have a higher classification accuracy.

According to this, in an optional implementation, the above 106 may include the following steps:

S161, determining a learning rate of a target category according to the number of detection objects of each category in the teacher model and the number of detection objects of each category in the student model.

Among them, for each category, the learning rate of the category refers to the learning status of the student model learning from the teacher model for the category. If the learning rate of the category is higher, it means that the learning status of the student model learning from the teacher model for this category is better, and the category is more likely to be identified; if the learning rate of the category is lower, it means that the learning status of the student model learning from the teacher model for this category is worse, and the category is less likely to be identified.

Optionally, for each category, a ratio between the number of detection objects of the category in the student model and the number of detection objects of the category in the teacher model can be determined as the learning rate of the category.

In other words, the learning rate of each category can be determined by the following formula (2):

$$\mathcal{R}_i = \frac{Q_{stu_i}}{Q_{tea_i}}, i \in \{1,2, \ldots , z\} \tag{2}$$

Among them, $\mathcal{R}_i$ represents the learning rate of the i-th category, $Q_{tea_i}$ represents the number of detection objects of the i-th category in the teacher model, $Q_{stu_i}$ represents the number of detection objects of the i-th category in the student model, and z represents a total number of categories.

Optionally, in order to make the learning rate of each category accurately reflect the learning status of the student model learning from the teacher model, the learning rate of each category can be determined according to the ratio between the number of detection objects of each category.

For example, the learning rate of each category can be determined in the following way: for each category, according to a ratio between the number of detection objects of the category in the teacher model and a first total number of detection objects, determining a first proportion of detection objects of the category, where the first total number of detection objects is a sum of the number of detection objects of each of the plurality of categories in the teacher model; according to a ratio between the number of detection objects of the category in the student model and a second total number of detection objects, determining a second proportion of detection objects of the category, where the second total number of detection objects is a sum of the number of detection objects of each of the plurality of categories in in the student model; further, according to a ratio between the first proportion of detection objects and the second proportion of detection objects, determining the learning rate of the category.

In other words, the learning rate of each category can be determined by the following formula (3) to formula (5):

$$\overleftarrow{Q}_{tea_i} = \frac{Q_{tea_i}}{\sum_{g=1}^{z} Q_{tea_g}}, i \in \{1,2, \ldots , z\} \tag{3}$$

$$\overleftarrow{Q}_{stu_i} = \frac{Q_{stu_i}}{\sum_{g=1}^{z} Q_{stu_g}}, i \in \{1,2, \ldots , z\} \tag{4}$$

$$\mathcal{R}_i = \frac{\overleftarrow{Q}_{stu_i}}{\overleftarrow{Q}_{tea_i}}, i \in \{1,2, \ldots , z\} \tag{5}$$

Among them, $\mathfrak{R}_i$ represents the learning rate of the i-th category, $\overleftarrow{Q}_{tea_i}$ represents the proportion of detection objects of the i-th category in the teacher model, $\overleftarrow{Q}_{stu_i}$ represents the proportion of detection objects of the i-th category in the student model, and $Q_{tea_i}$ represents the number of detection objects of the i-th category corresponding to the teacher model, $Q_{tea_g}$ represents the number of detection objects of the g-th category corresponding to the teacher model, represents the total b detection objects corresponding to the teacher model, $$\sum_{g=1}^{z} Q_{tea_g}$$

represents the total number of detection objects corresponding to the teacher model, $Q_{stu_i}$ represents the number of detection objects of the i-th category corresponding to the student model, and $Q_{stu_g}$ represents the number of detection objects of the g-th category corresponding to the student model, $$\sum_{g=1}^{z} Q_{stu_g}$$

represents the total number of detection objects corresponding to the student model, and z represents the total number of categories.

Optionally, considering that the classification reference information usually includes the detection object identified as a category of a background, but in actual applications, only the detection object of non-background category is usually considered to be identified. According to this, before the S106, the label generation method provided by the embodiment of the present application may also include: eliminating a category of an image background from the plurality of categories. Then, determine the learning rate of each category through any of the above methods.

For example, the learning rate of each category can be determined by the following formula (6) to formula (8):

$$\overleftarrow{Q}_{tea_i} = \frac{Q_{tea_i}}{\sum_{g=1}^{z} Q_{tea_g} - Q_{tea_h}}, i \in \{1,2, \ldots , z\} \backslash h \tag{6}$$

$$\overleftarrow{Q}_{stu_i} = \frac{Q_{stu_i}}{\sum_{g=1}^{z} Q_{stu_g} - Q_{stu_h}}, i \in \{1,2, \ldots , z\} \backslash h \tag{7}$$

$$\mathcal{R}_i = \frac{\overleftarrow{Q}_{stu_i}}{\overleftarrow{Q}_{tea_i}}, i \in \{1,2, \ldots , z\} \backslash h \tag{8}$$

Among them, $\mathfrak{R}_i$ represents the learning rate of the i-th category, $\overleftarrow{Q}_{tea_i}$ represents the proportion of detection objects of the i-th category in the teacher model, $\overleftarrow{Q}_{stu_i}$ represents the proportion of detection objects of the i-th category in the student model, and $Q_{tea_g}$ represents the number of detection objects of the g-th category corresponding to the teacher model, $$\sum_{g=1}^{z} Q_{tea_g}$$

represents the total number of detection objects corresponding to the teacher model, h represents the image background, $Q_{tea_h}$ represents a number of detection objects of the category of the image background in the teacher model, $Q_{stu_i}$ represents the number of detection objects of the i-th category corresponding to the student model, $Q_{stu_g}$ represents the number of detection objects of the g-th category corresponding to the student model, $$\sum_{g=1}^{z} Q_{stu_g}$$

represents the total number of detection objects corresponding to the student model, $Q_{stu_h}$ represents the number of detection objects of the category of the image background in the student model, and z represents the total number of categories.

S162, determining the probability threshold of the target category according to the learning rate of the target category.

Optionally, according to the learning rate of each category, searching a preset corresponding relationship between the learning rate and the probability threshold and obtaining the corresponding probability threshold as the probability threshold of each category. Among them, the preset corresponding relationship can be set according to actual needs, which is not limited in the embodiment of the present application.

Optionally, in order to avoid pseudo labels generated according to probability thresholds from filtering out more detection objects in categories that are difficult to identify, resulting in unbalanced learning of different categories by the student model, the above-mentioned S162 can be specifically implemented as: determining a maximum learning rate from learning rates of the plurality of categories, and according to a ratio between the learning rate of each category and the maximum learning rate, determining a weight coefficient of each category; further, according to a product of the weight coefficient of each category and a preset probability upper limit value, determining the probability threshold of each category.

It is worth noting that in an actual training process of the image classification model of the semi-supervised object detection framework, as model parameters are continuously adjusted, after the same unlabeled image is identified by the image classification model in each iteration process, the classification reference information obtained is different, and the learning rates of each of the plurality of categories obtained in each iteration process are different. For this reason, in each iteration process, according to the classification reference information obtained during the iteration process, determining the learning rate of each of the plurality of categories and the maximum learning rate in the iteration process, and obtaining the probability threshold of each category in the iteration process in order to generate the pseudo label of the unlabeled image.

For example, the probability threshold of each category can be determined by the following formula (9) and formula (10):

$$W_k^e = \left(\frac{\mathcal{R}_k^e}{\mathcal{R}_{max}^e}\right)^T \tag{9}$$

$$\gamma_k^e = W_k^e \cdot \tau \tag{10}$$

Among them, $$W_k^e$$

represents a weight coefficient of the k-th category in the e-th iteration process, $$\mathcal{R}_k^e$$

represents the learning rate of the k-th category in the e-th iteration process, and $$\mathcal{R}_{max}^e$$

represents the maximum learning rate in learning rates of the plurality of categories in the e-th iteration process, $$\mathcal{R}_{max}^e = \max\{\mathcal{R}_1^e, \mathcal{R}_2^e, \ldots, \mathcal{R}_k^e, \ldots, \mathcal{R}_z^e\},$$

z represents the total number of categories, T represents a hyperparameter used to adjust the weight coefficient, $$\gamma_k^e$$

represents the probability threshold of the k-th category in the e-th iteration process, and τ represents the preset probability upper limit value. In actual applications, the preset probability threshold can be set according to actual needs, which is not limited in the embodiment of the present application.

It can be understood that the smaller the value of $\mathfrak{R}_k$ is, it means that compared with the teacher model, the student model identifies fewer detection objects of the kth category. Therefore, the detection objects of this category are likely to be in a poor learning status, and even a large number of detection objects of this category may be ignored in a generation of pseudo labels. By determining the probability threshold in the above way, a smaller probability threshold can be automatically assigned to this category, the generated pseudo label will help the student model extract more available unlabeled image; conversely, the greater the value of $\mathfrak{R}_i$ is, the student model identifies more detection objects of the k-th category than the teacher model. Therefore, the detection objects of this category are easily identified in the current learning status of the student model, and even tend to deviation of confirmation, by determining the probability threshold in the above way, a greater probability threshold can be automatically assigned to this category, and the generated pseudo labels are beneficial to the student model to selectively extract high-quality unlabeled images. It can be seen that by determining the probability threshold above, the generated pseudo labels can help alleviate the problem of imbalanced learning of different categories by the student model, thereby improving the training effect of the image classification model having the semi-supervised object detection framework, making the image classification model has the high classification accuracy.

This embodiment of the present application shows a specific implementation of the above S106. Of course, it should be understood that the above S106 can also be implemented in other ways, and this is not limited in the embodiment of the present application.

S108, generating the pseudo label of the unlabeled image for the student model according to the classification reference information of the teacher model and the probability threshold of each category.

Since the unlabeled image itself does not have a corresponding category label, according to the classification reference information obtained by the teacher model for the unlabeled image and the probability threshold of each category, the pseudo label of the unlabeled image is generated for the student model, which is equivalent to provide a manual label for the unlabeled image, so as to provide a guidance for a unsupervised learning task of the student model.

In practical applications, the pseudo label of the unlabeled image can be used to indicate the predicted category of the unlabeled image. Of course, the pseudo label of the unlabeled image can also be used to indicate the detection object in the unlabeled image and the predicted category of the detection object. For example, in a face classification and identification scenario, the detection object can be a face in the unlabeled image, and the predicted category of the detection object is the predicted category of the face.

In an optional implementation, the S108 may include: according to the classification reference information of the teacher model, selecting the category of the maximum probability from the probability of each detection object in each category, and determining the selected category as the predicted category of each detection object corresponding to the teacher model; if the predicted category of each detection object corresponding to the teacher model is greater than the probability threshold of the predicted category, then according to the predicted category of each detection object corresponding to the teacher model, generating the pseudo label of the unlabeled image for the student model.

For example, the pseudo label of the unlabeled image can be generated for the student model through the following formula (11):

$$\hat{y}^u_{\varsigma 2} = \text{ONE\_HOT}(\arg\max(q_1(x^u_\varsigma))) \text{ if } \max(q_1(x^u_\varsigma)) \geq \gamma^e_\sigma \tag{11}$$

Among them, $$\hat{y}^u_{\varsigma 2}$$

represents the pseudo label of the unlabeled image $$x^u_\varsigma$$

generated for the student model, ONE_HOT represents an one-hot encoding, $q_i$ represents the teacher model, $$q_1(x^u_\varsigma)$$

represents the classification reference information output by the teacher model for the unlabeled image $$x^u_\varsigma,$$

max $$(q_1(x^u_\varsigma))$$

represents the maximum probability in the classification reference information, arg max $$(q_1(x^u_\varsigma))$$

represents the predicted category of the detection object corresponding to the teacher model, $$\gamma^e_\sigma$$

represents the probability threshold of the predicted category in the e-th iteration process.

It can be understood that by generating the pseudo label of the unlabeled image for the student model according to the predicted category only when the predicted category of each detection object corresponding to the teacher model is greater than the probability threshold of the predicted category, it can be extremely effective to minimize a possibility of introducing noise or errors in the pseudo label, thereby ensuring that the student model can learn the noise in the unlabeled image according to the accurate classification and identification result, which is beneficial to improving the learning effect of the student model.

This embodiment of the present application shows a specific implementation of the above S108. Of course, it should be understood that the above S108 can also be implemented in other ways, and this is not limited in the embodiment of the present application.

For the semi-supervised object detection framework including the teacher model and the student model, the label generation method provided by the embodiment of the present application counts the number of detection objects corresponding to the same category for each model based on the classification reference information obtained by the teacher model and the student model respectively identifying the same unlabeled image, and evaluates the learning statuses (or learning difficulties) of the teacher model and the student model separately for the same category, thereby determining the probability threshold of each category; further, according to the classification reference information of the teacher model and the probability threshold of each category, generating the pseudo label of the unlabeled image for the student model, which can avoid a large number of detection objects in difficult categories from being filtered, alleviate the problem of unbalanced learning of different categories by the student model, and thereby improve the training effect of the image classification model having the semi-supervised object detection framework and make the image classification model have a high classification accuracy.

According to the label generation method shown in the above embodiment of the present application, the pseudo label generated for the unlabeled image can be applied to the image classification model with the semi-supervised object detection framework for a semi-supervised learning, and obtain an image classification model which can accurately identify an image to be processed. The training process of the image classification model is explained in detail below.

Figure 3:
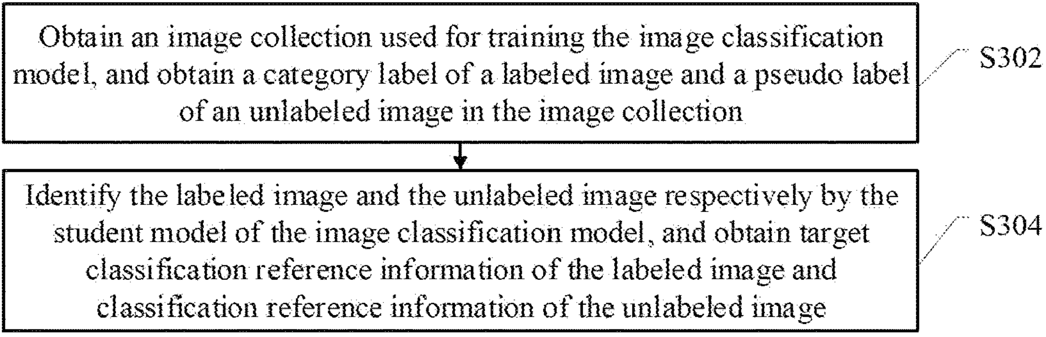
FIG. 3 is a schematic flowchart of a training method for an image classification model provided by an embodiment of the present application.

Please refer to FIG. 3, which is a schematic flow chart of a training method for an image classification model provided in one embodiment of the present application. The method is used to train the image classification model with the semi-supervised object detection framework. The image classification model includes the teacher model and the student model, the method can include the following steps:

S302, obtaining an image collection used for training the image classification model, and obtaining a category label of a labeled image and a pseudo label of an unlabeled image in the image collection.

The image collection includes the labeled image and the unlabeled image, and the pseudo label of the unlabeled image is generated according to the label generation method described in the embodiment of the present application.

S304, identifying the labeled image and the unlabeled image respectively by the student model of the image classification model, and obtaining target classification reference information of the labeled image and target classification reference information of the unlabeled image.

The student model can perform an object detection on each image of the image collection, identify candidate bounding boxes for the detection object, and then eliminate a redundant candidate bounding box using a non-maximum suppression (NMS) to determine the detection object included in each image, and then identify the detection object according to image features of the detection object, and obtain the classification reference information of the detection object included in each image.

S306, adjusting model parameters of the image classification model according to the target classification reference information of the labeled image, the category label of the labeled image, the target classification reference information of the unlabeled image, and the pseudo label of the unlabeled image.

The model parameters of the image classification model may include model parameters of the teacher model and model parameters of the student model. For each model, taking a neural network as an example, its model parameters may include but are not limited to a number of neurons in each network layer in the model, a connection relationship between neurons in different network layers and edge weights, a bias of the neuron in each network layer, etc.

Figure 4:
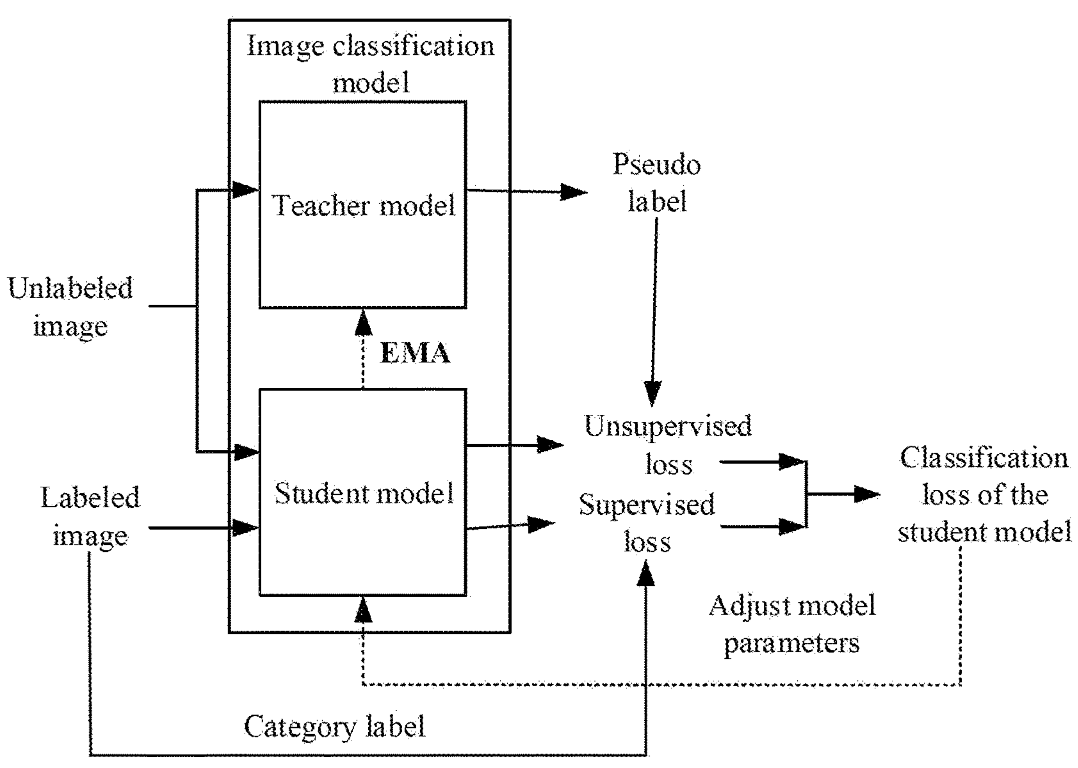
FIG. 4 is a schematic diagram of a training method for an image classification model provided by another embodiment of the present application.

As shown in FIG. 4, by having the teacher model generate the pseudo label of the unlabeled image for the student model, the student model can, under the guidance of the teacher model, execute a semi-supervised learning task, based on the classification reference information of each image in the image collection, the category label of each labeled image in the image collection and the pseudo label of each unlabeled image in the image collection, the semi-supervised learning task includes a supervised learning task based on the labeled image and its corresponding category label, and an unsupervised learning task based on the unlabeled image.

Considering that each learning task may produce a certain classification loss, according to this, in order to improve the training effect of the image classification model, in an optional implementation, the above S306 may include the following steps:

S341, determining a supervised loss of the student model according to the category label of the labeled image and the target classification reference information of the labeled image.

Among them, the supervised loss of the student model is used to represent a classification loss generated by the student model performing the supervised learning task.

The supervised loss of the student model can be determined according to the category label of the labeled image, the target classification reference information of the labeled image, and a first preset loss function. In practical applications, the first preset loss function can be set according to actual needs, including but not limited to at least one of a cross-entropy loss function, a classification loss function, and a bounding box regression loss function.

For example, the supervised loss of the student model can be determined by the following formula (12):

$$\mathcal{L}_s = \frac{1}{N_l}\sum_b \mathcal{L}_{cls}(x_b^l, y_b^l) + \mathcal{L}_{reg}(x_b^l, y_b^l) \tag{12}$$

$\mathcal{L}$ represents the supervised loss of the student model, $N_l$ represents a number of labeled images in the image collection, $$x_b^l$$

represents the l-th labeled image in the image collection, $$y_b^l$$

represents the category label of the labeled image $$x_b^l,$$

$\mathcal{L}_{cls}$ represents the classification loss function, and $\mathcal{L}_{reg}$ represents the bounding box regression loss function.

S342, determining an unsupervised loss of the student model according to the pseudo label of the unlabeled image and the target classification reference information of the unlabeled image.

Among them, the unsupervised loss of the student model is used to represent a classification loss generated by the student model performing the unsupervised learning task.

The unsupervised loss of the student model can be determined according to the pseudo label of the unlabeled image, the target classification reference information of the unlabeled image, and a second preset loss function. In practical applications, the second preset loss function can be set according to actual needs, including but not limited to at least one of a cross-entropy loss function, a classification loss function, and a bounding box regression loss function.

For example, the supervised loss of the student model can be determined by the following formula (13):

$$\mathcal{L}_u = \frac{1}{N_u}\sum_b \mathcal{L}_{cls}(x_b^u, \hat{y}_b^u) + \mathcal{L}_{reg}(x_b^u, \hat{y}_b^u) \tag{13}$$

Among them, $\mathcal{L}_u$ represents the unsupervised loss of the student model, $N_u$ represents a number of unlabeled images in the image collection, $$x_b^u$$

represents the b-th unlabeled image in the image collection, and $$\hat{y}_b^u$$

represents the pseudo label of the unlabeled image $$x_b^u.$$

S343, determining a classification loss of the student model according to the supervised loss of the student model and the unsupervised loss of the student model.

For example, the classification loss of the student model is determined as the following formula (14):

$$\mathcal{L}=\mathcal{L}_s+\lambda_u\mathcal{L}_u \quad (14)$$

Among them, $\mathcal{L}$ represents the classification loss of the student model, $\mathcal{L}_s$ represents the supervised loss of the student model, $\mathcal{L}_u$ represents the unsupervised loss of the student model, and $\lambda_u$ represents a loss weight of the unsupervised loss.

It can be understood that the student model performs the semi-supervised learning task according to the image collections, which combines the supervised learning according to the labeled image and its category label and the unsupervised learning according to the unlabeled image and its pseudo label, each learning task may produce a certain classification loss. Therefore, according to the target classification reference information output by the student model for the labeled image and the category label of the labeled image, determining the supervised loss of the student model, so that the supervised loss produced when the student model performs the supervised learning task can be accurately reflected; according to the pseudo label of the unlabeled image and the target classification reference information of the unlabeled image, determining the unsupervised loss of the student model, so that the unsupervised loss when the student model performs the unsupervised learning task can be accurately reflected.

S344, according to the classification loss of the student model, adjusting the model parameters of the student model.

Since the classification loss of the student model can reflect a difference between the target classification reference information output by the student model when identifying an input image, and the category label of the input image, in order to obtain a high-accuracy student model, the network parameters of the student model can be adjusted by using a back propagation algorithm according to the classification loss of the student model.

When adjusting the model parameters of the student model by using the back propagation algorithm, the back propagation algorithm can be used to determine the classification loss caused by each network layer of the student model according to the classification loss of the student model and current model parameters of the student model; then, in order to make a goal of reducing the classification loss of the student model, relevant parameters of each network layer in the student model are adjusted layer by layer.

This embodiment of the present application shows a specific implementation of the above S344. Of course, it should be understood that the above S344 can also be implemented in other ways, and the embodiment of the present application does not limit this.

It should be noted that the above process is only one process of adjusting model parameters. In actual applications, the image classification model may need to be adjusted multiple times. Therefore, the above steps S302 to S304 can be repeated multiple times until a preset condition of ending a training is met, thus obtaining a final student model. The preset condition of ending the training may be that the classification loss of the student model is less than a preset loss threshold, or it may be that a number of adjustments reaches a preset number, etc. This is not limited in the embodiment of the present application.

Furthermore, the above S304 may also include:

S345, adjusting the model parameters of the teacher model according to the model parameters of the student model and an exponential moving average adjustment strategy.

For example, the model parameters of the teacher model may include a classification weight of the teacher model, and the model parameters of the student model may include a classification weight of the student model. The classification weight of each model is used to weight the classification reference information obtained by each model when using the image classification model to recognize the image to be processed, to obtain a final classification and identification result. In this case, when adjusting a sum of the classification weights of the student model, the classification weight of the teacher model can be adjusted to an exponential moving average (EMA) of the classification weight of the student model.

This embodiment of the present application shows a specific implementation of the above S304. Of course, it should be understood that the above S304 can also be implemented in other ways, and this is not limited in the embodiment of the present application.

For the image classification model with the semi-supervised object detection framework, the training method of the image classification model provided by the embodiment of the present application uses the student model of the image classification model to identify the labeled image and the unlabeled image in the image collection respectively, obtains the classification reference information of the labeled image and the classification reference information of the unlabeled image, and then uses the label generation method provided by the embodiment of the present application to generate the pseudo label of the unlabeled image for the student model, to provide the guidance to the learning process of the student model, adjusts the model parameters of the image classification model according to the classification reference information of each image in the image collection, the category label of the labeled image in the image collection, and the pseudo label of the unlabeled image in the image collection, to help alleviate the problem of imbalanced learning of different categories by the student model, thereby improving the training effect of the image classification model with the semi-supervised object detection framework, so that the image classification model has a higher classification accuracy.

The above embodiment introduces the training method of the image classification model. Through the above training method, the image classification model for different application scenarios can be trained. For different application scenarios, the image collection used to train the image classification model and the label of each image included in the image collection can be selected according to the application scenario. Application scenarios applicable to the training method provided by the embodiment of the present application may include, but are not limited to, a target detection, a facial expression classification, a natural animal classification, a handwritten digit identification and other scenarios. Taking the application scenario of the natural animal classification as an example, the category label of the labeled image is used to mark the detection object included in the labeled image and the category of the detection object, such as the cat, dog, horse, etc. The image classification model trained by the training method provided by the embodiment of the present application can detect an area of the detection object in the image to be processed, and can identify the category of the detection object.

According to the training method of the image classification model shown in the above embodiment of the present application, the image classification model that has been trained can be applied to any scenario that requires to identify the image. An application process based on the image classification model is described in detail below.

The embodiment of the present application also provides an image classification method of the image classification model, which can identify the image to be processed according to the image classification model trained by the above training method. Please refer to FIG. 5, which is a schematic flowchart of an image classification method according to an embodiment of the present application. The method may include the following steps:

S502, identifying the image to be processed through a target model of the image classification model, and obtaining classification reference information of the target model.

Among them, the image classification model is a model with the semi-supervised detection framework, which includes the teacher model and the student model. The target model includes the teacher model and/or the student model. The teacher model is used to identify the image to be processed, and obtain the classification reference information of the image to be processed corresponding to the teacher model; the student model is used to identify the image to be processed, and obtain the classification reference information of the image to be processed corresponding to the student model.

S504, determining the detection object included in the image to be processed and the category of the detection object according to the classification reference information of the target model.

Optionally, the detection object included in the image to be processed and the category of the detection object can be determined according to the classification reference information of the image to be processed corresponding to either the teacher model or the student model. For example, the category of the highest probability in the classification reference information of the image to be processed corresponding to the teacher model, can be determined to be the category of the detection object included in the image to be processed, or the category of the highest probability in the classification reference information of the image to be processed corresponding to the student model, can be determined to be the category of the detection object included in the image to be processed.

Optionally, the plurality of classification reference information of the image to be processed can also be integrated to determine the detection object included in the image to be processed and the category of the detection object. For example, if the classification category of a highest classification probability in the classification reference information (for convenience of description, hereafter referred to as "first classification reference information") of the image to be processed corresponding to the student model is consistent with the category of a highest classification probability in the classification reference information (for convenience of description, hereafter referred to as "second classification reference information") of the image to be processed corresponding to the teacher model, then the category can be determined as the category of the detection object included in the image to be processed; for another example, the category of the detection object included in the image to be processed can be determined according to an intersection between a first collection of target categories in the first reference information and a second collection of target categories in the second category reference information of the image to be processed, among them, the first collection of target categories includes categories corresponding to probabilities exceeding the preset probability threshold in the first classification reference information, and the second collection of target categories includes categories corresponding to probabilities exceeding the preset probability threshold in the second classification reference information, and so on.

For the image classification model with the semi-supervised object detection framework, in the semi-supervised learning process of the image classification model, since the pseudo-label of the unlabeled image used by the image classification method provided by the embodiment of the present application is obtained by dynamically evaluating the learning status (or learning difficulty) of each category by the teacher model and the student model respectively, it is helpful to alleviate the problem of unbalanced learning of different categories by the student model, then the image classification model that has been trained has a higher classification accuracy; further, it is helpful to improve the accuracy and reliability of the image classification result by using the image classification model to identify the image to be processed.

The foregoing describes specific embodiments of this specification. Other embodiments are within the scope of the appended claims. In some cases, the actions or steps recited in the claims can be performed in a different order than in the embodiments and still achieve desired results. Additionally, the processes depicted in the figures do not necessarily require a specific order that is shown, or a sequential order, to achieve desirable results. A multitasking processing and a parallel processing are also possible or may be advantageous in certain implementations.

In addition, corresponding to the label generation method shown in FIG. 1 above, embodiment of the present application also provide a label generation device. Please refer to FIG. 6, which is a schematic structural diagram of a label generation device 600 provided by an embodiment of the present application. The label generation device is applied in the semi-supervised object detection framework. The semi-supervised object detection framework includes the teacher model and the student model. The device 600 includes a classification unit 610 used to identify the unlabeled image through the teacher model, and obtain the classification reference information of the teacher model, identify the unlabeled image through the student model and obtain the classification reference information of the student model; both the classification reference information of the teacher model and the classification reference information of the student model include N detection objects included in the unlabeled image and the probability of each detection object of the N detection objects in each category of the plurality of categories; N is the positive integer; a determination unit 620 used to determine the number of detection objects of each category of the plurality of categories in the teacher model according to the classification reference information of the teacher model, and determine the number of detection objects of each category of the plurality of categories in the student model according to the classification reference information of the student model; the determination unit 620 also used to determine the probability threshold of each category according to the number of detection objects of each category in the teacher model and the number of detection objects of each category in the student model; a generation unit 630 used to generate the pseudo label of the unlabeled image for the student model according to the classification reference information of the teacher model and the probability threshold of each category.

Optionally, when determining the probability threshold of each category according to the number of detection objects of each category in the teacher model and the number of detection objects of each category in the student model, the determination unit 620 executes the following steps: determining the learning rate of each category according to the number of detection objects of each category in the teacher model and the number of detection objects of each category in the student model; determining the probability threshold of each category according to the learning rate of each category.

Optionally, when determining the learning rate of each category according to the number of detection objects of each category in the teacher model and the number of detection objects of each category in the student model, the determination unit 620 executes the following steps: determining the first proportion of detection objects of each category according to the ratio between the number of detection objects of each category in the teacher model and the first total number of detection objects, the first total number of detection objects is the sum of the number of detection objects of each category of the plurality of categories in the teacher model; determining the second proportion of detection objects of each category, according to the ratio between the number of detection objects of each category in the student model and the second total number of detection objects, the second total number of detection objects is the sum of the number of detection objects of each category of the plurality of categories in the student model; determining the learning rate of each category according to the ratio between the first proportion of detection objects and the second proportion of detection objects.

Optionally, when determining the probability threshold of each category according to the learning rate of each category, the determination unit 620 performs the following steps: determining the maximum learning rate from the learning rates of the plurality of categories; determining the weight coefficient of each category according to the ratio between the learning rate of each category and the maximum learning rate; determining the probability threshold of each category according to the product of the weight coefficient of each category and the preset probability upper limit value.

Optionally, the device 600 further includes an elimination unit 640 used to eliminate the category of the image background from the plurality of categories before the determination unit determining the probability threshold of each category according to the number of detection objects of each category in the teacher model and the number of detection objects of each category in the student model.

Optionally, the determination unit 620 performs following steps when determining the number of detection objects of each category of the plurality of categories in the teacher model according to the classification reference information of the teacher model, and determining the number of detection objects of each category of the plurality of categories in the student model according to the classification reference information of the student model: according to the classification reference information of the teacher model, selecting the category corresponding to the maximum probability from the probability of each detection object in each category, and determining the category as the predicted category of each detection object corresponding to the teacher model, and determining the number of detection objects of each of the plurality of categories in the teacher model according to the predicted category of each detection object corresponding to the teacher model; according to the classification reference information of the student model, selecting the category of the maximum probability from the probability of each detection object in each category, and determining the category as the predicted category of each detection object corresponding to the student model, and determining the number of detection objects of each of the plurality of categories in the student model according to the predicted category of each detection object corresponding to the student model.

Optionally, the generation unit 630 performs following steps when generating the pseudo label of the unlabeled image for the student model according to the classification reference information of the teacher model and the probability threshold of each category: if the predicted category of each detection object corresponding to the teacher model is greater than the probability threshold of the predicted category, then according to the predicted category of each detection object corresponding to the teacher model, generating the pseudo label of the unlabeled image for the student model.

Obviously, the label generation device provided by the embodiment of the present application can be used as an execution subject of the label generation method shown in FIG. 1. For example, step S102 in the label generation method shown in FIG. 1 can be executed by the classification unit of the label generation device shown in FIG. 6. Steps S104 and S106 may be executed by the determination unit of the label generation device, and step S108 may be executed by the generation unit of the label generation device.

Figure 6:
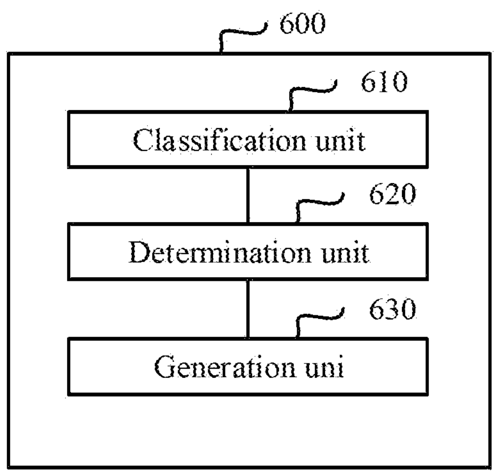
FIG. 6 is a schematic structural diagram of a label generation device provided by an embodiment of the present application.

According to another embodiment of the present application, each unit of the label generation device shown in FIG. 6 can be separately or entirely formed by combining into one or several other units, or formed by some of the units, which can also be further divided into multiple units with smaller functions, which can achieve the same operation without affecting the realization of the technical effects of the embodiment of the present application. The above units are divided based on logical functions. In practical applications, the function of one unit can also be realized by multiple units, or the functions of multiple units can be realized by one unit. In other embodiment of the present application, the label generation device may also include other units, in practical applications, these functions may also be implemented with the assistance of other units and may be implemented by multiple units in cooperation.

According to another embodiment of the present application, the label generation device shown in FIG. 6 can be constructed by running a computer program (including program codes) capable of executing each step involved in the corresponding method shown in FIG. 1 on a general-purpose computing device of a computer, which includes the processing components and storage components such as a central processing unit (CPU), a random access memory (RAM), a read-only memory (ROM), and so on, to implement the label generation method in the embodiment of the present application. The computer program can be recorded on, for example, a computer-readable storage medium, and can be reproduced in an electronic device through the computer-readable storage medium and run therein.

For the semi-supervised object detection framework including the teacher model and the student model, the label generation method provided by the embodiment of the present application counts the number of detection objects corresponding to the same category for each model based on the classification reference information obtained by the teacher model and the student model respectively identifying the same unlabeled image, and evaluates the learning statuses (or learning difficulties) of the teacher model and the student model separately for the same category, thereby determining the probability threshold of each category; further, according to the classification reference information of the teacher model and the probability threshold of each category, generating the pseudo label of the unlabeled image for the student model, which can avoid a large number of detection objects in difficult categories from being filtered, alleviate the problem of unbalanced learning of different categories by the student model, and thereby improve the training effect of the image classification model having the semi-supervised object detection framework and make the image classification model have a high classification accuracy.

In addition, corresponding to the training method of the image classification model shown in FIG. 3 above, embodiment of the present application also provide a training device for the image classification model. Please refer to FIG. 7, which is a schematic structural diagram of a training device 700 of the image classification model provided by an embodiment of the present application. The device 700 includes an obtaining unit 710 used to obtain the image collection for training the image classification model, the image collection including the labeled image and the unlabeled image, and obtain the category label of the labeled image and the pseudo label of the unlabeled image, the pseudo label of the unlabeled image being generated according to the label generation method described in the first aspect; a classification unit 720 used to identify the labeled image and the unlabeled image respectively through the student model, and obtain the target classification reference information of the labeled image and the target classification reference information of the unlabeled image; an adjustment unit 730 used to adjust the model parameters of the image classification model according to the target classification reference information of the labeled image, the category label of the labeled image, the target classification reference information of the unlabeled image, and the pseudo label of the unlabeled image.

Optionally, the model parameters of the image classification model include the model parameters of the student model.

The adjustment unit 730 performs the following steps when adjusting the model parameters of the image classification model according to the target classification reference information of the labeled image, the category label of the labeled image, the target classification reference information of the unlabeled image, and the pseudo label of the unlabeled image: determining the supervised loss of the student model according to the category label of the labeled image and the target classification reference information of the labeled image; determining the unsupervised loss of the student model according to the pseudo label of the unlabeled image and the target classification reference information of the unlabeled image; determining the classification loss of the student model according to the supervised loss and the unsupervised loss; adjusting the model parameters of the student model according to the classification loss of the student model.

Optionally, the model parameters of the image classification model also include the model parameters of the teacher model.

The adjustment unit 730 is also used to adjust the model parameters of the teacher model according to the model parameters of the student model and the exponential moving average adjustment strategy.

Figure 7:
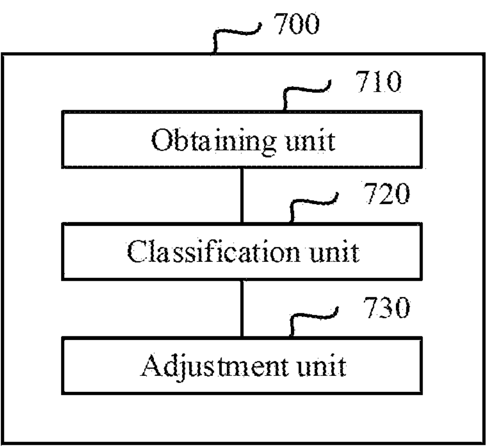
FIG. 7 is a schematic structural diagram of a training device for the image classification model provided by an embodiment of the present application.

Obviously, the training device of the image classification model provided by the embodiment of the present application can be used as the execution subject of the training method of the image classification model shown in FIG. 3. For example, step S302 in the training method of the image classification model shown in FIG. 3 can be executed by the obtaining unit 710 of the training device of the image classification model as shown in FIG. 7. Step S304 can be executed by the classification unit 720 of the training device of the image classification model. Step S306 can be executed by the adjustment unit 730 of the training device of the image classification model.

According to another embodiment of the present application, each unit of the training device of the image classification model shown in FIG. 7 can be separately or entirely formed by combining into one or several other units, or formed by some of the units, which can also be further divided into multiple units with smaller functions, which can achieve the same operation without affecting the realization of the technical effects of the embodiment of the present application. The above units are divided based on logical functions. In practical applications, the function of one unit can also be realized by multiple units, or the functions of multiple units can be realized by one unit. In other embodiment of the present application, the training device of the image classification model may also include other units, these functions may also be implemented with the assistance of other units and may be implemented by multiple units in cooperation.

According to another embodiment of the present application, the training device of the image classification model shown in FIG. 7 can be constructed by running a computer program (including program codes) capable of executing each step involved in the corresponding method shown in FIG. 3 on a general-purpose computing device of a computer, which includes the processing components and storage components such as a central processing unit, a random access memory, a read-only memory, and so on, to implement the training method of the image classification model in the embodiment of the present application. The computer program can be recorded on, for example, a computer-readable storage medium, and can be reproduced in an electronic device through the computer-readable storage medium and run therein.

For the image classification model with the semi-supervised object detection framework, the training method of the image classification model provided by the embodiment of the present application uses the student model of the image classification model to identify the labeled image and the unlabeled image in the image collection respectively, obtains the classification reference information of the labeled image and the classification reference information of the unlabeled image, and then uses the label generation method provided by the embodiment of the present application to generate the pseudo label of the unlabeled image for the student model, to provide the guidance to the learning process of the student model, and adjusts the model parameters of the image classification model according to the classification reference information of each image in the image collection, the category label of the labeled image in the image collection, and the pseudo label of the unlabeled image in the image collection, to help alleviate the problem of imbalanced learning of different categories by the student model, thereby improving the training effect of the image classification model with the semi-supervised object detection framework, so that the image classification model has a higher classification accuracy.

Figure 5:
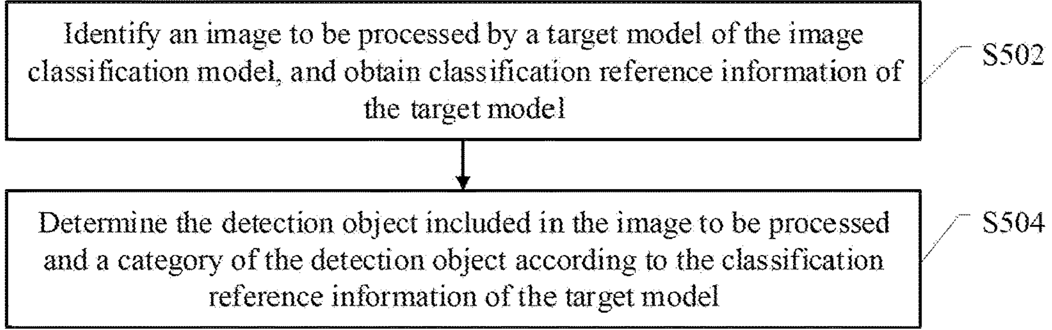
FIG. 5 is a schematic flow chart of an image classification method provided by an embodiment of the present application.

In addition, corresponding to the image classification method shown in FIG. 5 above, embodiment of the present application also provide an image classification device. Please refer to FIG. 8, which is a schematic structural diagram of an image classification device 800 according to an embodiment of the present application. The device 800 includes a classification unit 810 used to identify the image to be processed through the target model of the image classification model, and obtain the classification reference information of the target model; a determination unit 820 used to determine the detection object included in the image to be processed and the category of the detection object according to the classification reference information of the target model; among them, the image classification model is the model with the semi-supervised object detection framework, the image classification model includes the teacher model and the student model, and the target model includes the teacher model and/or the student model; the image classification is obtained by training according to the target classification reference information of the labeled image in the image collection, the target classification reference information of the unlabeled image in the image collection, the category label of the labeled image, and the pseudo label of the unlabeled image; the target classification reference information of the labeled image or the target classification information of the unlabeled image is obtained via identifying the labeled image or the unlabeled image by the student model of the image classification model; the pseudo label of the unlabeled image is determined through the label generation method mentioned above in the embodiment of the present application.

Obviously, the image classification device provided by the embodiment of the present application can be used as an execution subject of the image classification method shown in FIG. 5. For example, step S502 in the image classification method shown in FIG. 5 can be executed by the classification unit 810 of the image classification device shown in FIG. 8, and step S504 can be executed by the determination unit 820 of the image classification device.

Figure 8:
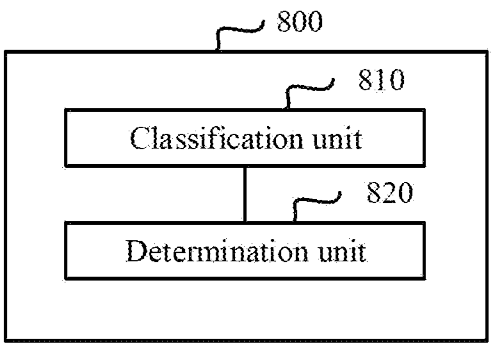
FIG. 8 is a schematic structural diagram of an image classification device provided by an embodiment of the present application.

According to another embodiment of the present application, each unit of the image classification device shown in FIG. 8 can be separately or entirely formed by combining into one or several other units, or formed by some of the units, which can also be further divided into multiple units with smaller functions, which can achieve the same operation without affecting the realization of the technical effects of the embodiment of the present application. The above units are divided based on logical functions. In practical applications, the function of one unit can also be realized by multiple units, or the functions of multiple units can be realized by one unit. In other embodiment of the present application, the image classification device may also include other units, in practical applications, these functions may also be implemented with the assistance of other units and may be implemented by multiple units in cooperation.

According to another embodiment of the present application, the image classification device shown in FIG. 8 can be constructed by running a computer program (including program codes) capable of executing each step involved in the corresponding method shown in FIG. 5 on a general-purpose computing device of a computer, which includes the processing components and storage components such as a central processing unit, a random access memory, a read-only memory, and so on, to implement the image classification method in the embodiment of the present application. The computer program can be recorded on, for example, a computer-readable storage medium, and can be reproduced in an electronic device through the computer-readable storage medium and run therein.

For the image classification model with the semi-supervised object detection framework, in the semi-supervised learning process of the image classification model, since the pseudo-label of the unlabeled image used by the image classification device provided by the embodiment of the present application is obtained by dynamically evaluating the learning status (or learning difficulty) of each category by the teacher model and the student model respectively, it is helpful to alleviate the problem of unbalanced learning of different categories by the student model, then the image classification model that has been trained has a higher classification accuracy; further, it is helpful to improve the accuracy and reliability of the image classification result by using the image classification model to identify the image to be processed.

Figure 9:
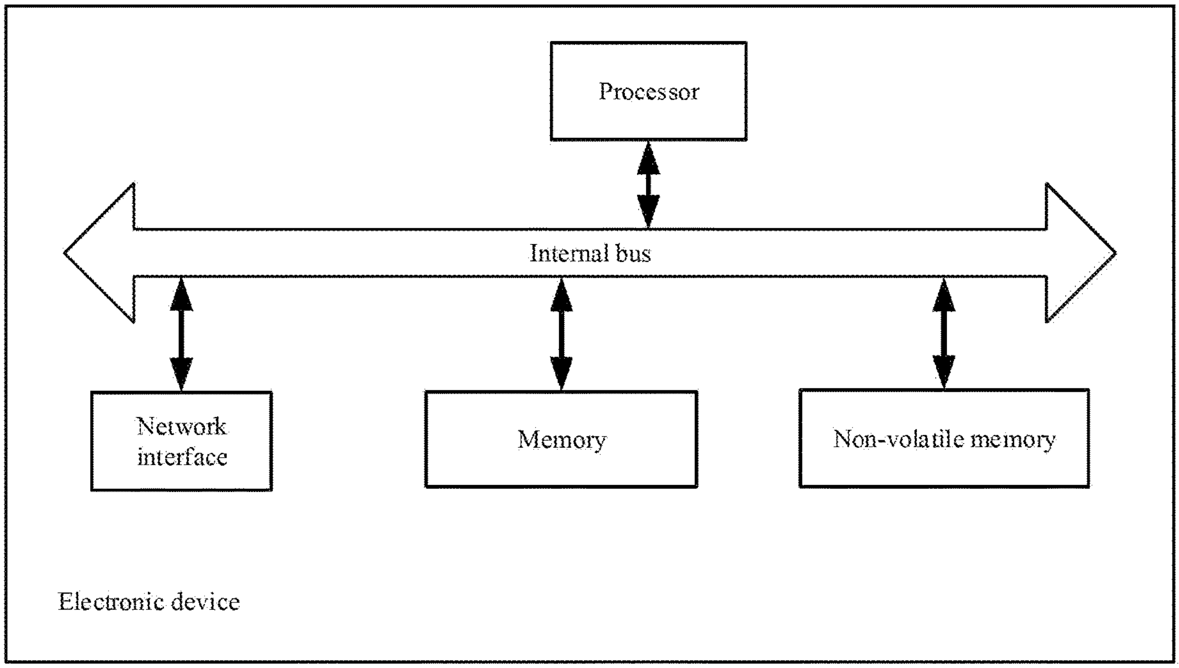
FIG. 9 is a schematic structural diagram of an electronic device according to an embodiment of the present application.

FIG. 9 is a schematic structural diagram of an electronic device according to an embodiment of the present application. Please refer to FIG. 9, for the hardware, the electronic device includes a processor, and optionally, further includes an internal bus, a network interface, and a storage device. Among them, the storage device may include a memory such as high-speed random-access memory (RAM), or may also include a non-volatile memory, such as at least one disk memory. Of course, the electronic device may also include other hardware required by the business.

The processor, the network interface and the storage device can be connected to each other through the internal bus, which can be an industry standard architecture (ISA) bus, a peripheral component interconnect (PCI) standard bus or an extended industry standard architecture (EISA) bus, etc. The bus can be distinguished as an address bus, a data bus, a control bus, etc. For ease of presentation, only one bidirectional arrow is used in FIG. 9, but it does not mean that there is only one bus or only one type of bus.

The storage device is used to store programs. Specifically, the program may include program codes including computer operating instructions. The storage device may include an internal memory and a non-volatile memory, and provides instructions and data to the processor.

The processor reads the corresponding computer program from the non-volatile memory into the memory and then runs it, to form the label generation device at a logical level. The processor executes the program stored in the storage device and specifically to perform the following operations: obtaining the classification reference information of the teacher model via identifying the unlabeled image by the teacher model of the semi-supervised object detection framework, and obtaining the classification reference information of the student model via identifying the unlabeled image by the student model of the semi-supervised object detection framework; both the classification reference information of the teacher model and the classification reference information of the student model include the N detection objects included in the unlabeled image that is identified and the probability of each detection object of the N detection objects in each category of the plurality of categories; N is the positive integer; determining the number of detection objects of each category of the plurality of categories in the teacher model according to the classification reference information of the teacher model, and determining the number of detection objects of each category of the plurality of categories in the student model according to the classification reference information of the student model; determining the probability threshold of each category according to the number of detection objects corresponding to the teacher model for each category and the number of detection objects of each category of the plurality of categories in the student model; generating the pseudo label of the unlabeled image for the student model according to the classification reference information of the teacher model and the probability threshold of each category.

Alternatively, the processor reads the corresponding computer program from the non-volatile memory into the memory and then runs it to form the training device of the image classification model at the logical level. The processor executes the program stored in the storage device and specifically to perform the following operations: obtaining the image collection used for training the image classification model, the image collection including the labeled image and the unlabeled image, and obtaining the category label of the labeled image and the pseudo label of the unlabeled image, the pseudo label of the unlabeled image being generated according to the label generation method described in the embodiment of the present application, the image classification model includes the teacher model and the student model; obtaining the target classification reference information of the labeled image and the target classification reference information of the unlabeled image via identifying the labeled image and the unlabeled image respectively by the student model; adjusting the model parameters of the image classification model according to the target classification reference information of the labeled image, the category label of the labeled image, the target classification reference information of the unlabeled image, and the pseudo label of the unlabeled image.

Alternatively, the processor reads the corresponding computer program from the non-volatile memory into the memory and then runs it to form the image classification device at the logical level. The processor executes the program stored in the storage device and specifically to perform the following operations: identifying the image to be processed by the target model of the image classification model, and obtaining the classification reference information of the target model; determining the detection object included in the image to be processed and the category of the detection object according to the classification reference information of the target model; among them, the image classification model is the model with the semi-supervised object detection framework, and the image classification model includes the teacher model and the student model, the target model includes the teacher model and/or the student model; the image classification model is obtained by training according to the target classification reference information of the labeled image in the image collection, the target classification reference information of the unlabeled image in the image collection, the category label of the labeled image and the pseudo label of the unlabeled image; the target classification reference information of the labeled image or the target classification information of the unlabeled image is obtained via identifying the labeled image or the unlabeled image by the student model of the image classification model; the pseudo label of the unlabeled image is determined through the label generation method in the embodiment of the present application.

At least one of the method performed by the label generation device disclosed in the embodiment shown in FIG. 1 of the present application, the method performed by the training device of the image classification model disclosed in the embodiment shown in FIG. 3 of the present application, and the method performed by the image classification device disclosed in the embodiment shown in FIG. 5 can be applied in the processor, or implemented by the processor. The processor may be an integrated circuit chip that has signal processing capabilities. During the implementation process, each step of the above method can be completed by integrated logic circuits of hardware or instructions in the form of software in the processor. The above-mentioned processor can be a general-purpose processor, including a central processing unit (CPU), a network processor (NP), etc.; it can also be a digital signal processor (DSP), an application specific integrated circuit, (ASIC), a field-programmable gate array (FPGA) or other programmable logic devices, discrete gates or transistor logic devices, and discrete hardware components. Each method, each step and each logical block diagram disclosed in the embodiment of the present application can be implemented or executed. The general-purpose processor may be a microprocessor or the processor may be any conventional processor, etc. The steps of the method disclosed in conjunction with the embodiment of the present application can be directly implemented by a hardware decoding processor, or executed by a combination of hardware and software modules in the decoding processor. The software module can be located in a random access memory, a flash memory, a read-only memory, a programmable read-only memory or an electrically erasable programmable memory, a register and other mature storage medium in this field. The storage medium is located in the storage device, and the processor reads the information from the storage device and completes the steps of the above method in combination with its hardware.

The electronic device can also perform the method of FIG. 1 and implement the functions of the label generation device in the embodiments shown in FIG. 1 and FIG. 2, or the electronic device can also perform the method of FIG. 3 and implement the functions of the training device of the image classification model shown in FIG. 3 and FIG. 4, or the electronic device can also perform the method of FIG. 5 and realize the functions of the image classification device in the embodiment shown in FIG. 5, the embodiment of the present application will not be described in detail here.

Of course, in addition to software implementation, the electronic device of the present application does not exclude other implementation methods, such as logic devices or a combination of software and hardware, etc. In other words, the execution subject of the following processing flow is not limited to each logical unit, it can also be a hardware or a logic device.

Embodiment of the present application also provide a computer-readable storage medium that stores one or more programs. The one or more programs include instructions, when the instructions are executed by a portable electronic device including a plurality of application programs, the portable electronic device can perform the method of the embodiment shown in FIG. 1, and is specifically used to perform the following operations: obtaining the classification reference information of the teacher model via identifying the unlabeled image by the teacher model of the semi-supervised object detection framework, and obtaining the classification reference information of the student model via identifying the unlabeled image by the student model of the semi-supervised object detection framework; both the classification reference information of the teacher model and the classification reference information of the student model include the N detection objects included in the unlabeled image that is identified and the probability of each detection object of the N detection objects in each category of the plurality of categories; N is the positive integer; determining the number of detection objects of each category of the plurality of categories in the teacher model according to the classification reference information of the teacher model, and determining the number of detection objects of each category of the plurality of categories in the student model according to the classification reference information of the student model; determining the probability threshold of each category according to the number of detection objects corresponding to the teacher model for each category and the number of detection objects of each category of the plurality of categories in the student model; generating the pseudo label of the unlabeled image for the student model according to the classification reference information of the teacher model and the probability threshold of each category.

Alternatively, when the instruction is executed by the portable electronic device including the plurality of application programs, it can cause the portable electronic device to perform the method of the embodiment shown in FIG. 3, and specifically used to perform the following operations:

Obtaining the image collection used for training the image classification model, the image collection including the labeled image and the unlabeled image, and obtaining the category label of the labeled image and the pseudo label of the unlabeled image, the pseudo label of the unlabeled image being generated according to the label generation method described in the embodiment of the present application, the image classification model includes the teacher model and the student model; obtaining the target classification reference information of the labeled image and the target classification reference information of the unlabeled image via identifying the labeled image and the unlabeled image respectively by the student model; adjusting the model parameters of the image classification model according to the target classification reference information of the labeled image, the category label of the labeled image, the target classification reference information of the unlabeled image, and the pseudo label of the unlabeled image.

Alternatively, when the instruction is executed by the portable electronic device including the plurality of application programs, it can cause the portable electronic device to perform the method of the embodiment shown in FIG. 5, and specifically used to perform the following operations:

Identifying the image to be processed by the target model of the image classification model, and obtaining the classification reference information of the target model; determining the detection object included in the image to be processed and the category of the detection object according to the classification reference information of the target model; among them, the image classification model is the model with the semi-supervised object detection framework, and the image classification model includes the teacher model and the student model, the target model includes the teacher model and/or the student model; the image classification model is obtained by training according to the target classification reference information of the labeled image in the image collection, the target classification reference information of the unlabeled image in the image collection, the category label of the labeled image and the pseudo label of the unlabeled image; the target classification reference information of the labeled image or the target classification information of the unlabeled image is obtained via identifying the labeled image or the unlabeled image by the student model of the image classification model; the pseudo label of the unlabeled image is determined through the label generation method in the embodiment of the present application.

In short, the above descriptions are only preferred embodiment of the present application and are not intended to limit the protection scope of the present application. Any modifications, equivalent replacements, improvements, etc. made within the spirit and principles of the present application shall be included in the protection scope of the present application.

The systems, devices, modules or units described in the above embodiments may be implemented by a computer chip or an entity, or by a product with a certain function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

The computer-readable medium includes both persistent and non-volatile, removable and non-removable media that can be implemented by any method or technology for storage of information. The information can be computer-readable instructions, data structures, modules of programs, or other data. Examples of the computer storage medium include, but are not limited to, a phase change memory (PRAM), a static random access memory (SRAM), a dynamic random access memory (DRAM), other types of random access memory (RAM), and read-only memory (ROM), electrically erasable programmable read-only memory (EEPROM), flash memory or other memory technology, compact disc read-only memory (CD-ROM), digital versatile disc (DVD) or other optical storage, Magnetic tape cassettes, tape disk storage or other magnetic storage devices or any other non-transmission medium can be used to store information that can be accessed by a computing device. As defined in this article, the computer-readable medium does not include a transitory medium, such as modulated data signals and carrier waves.

It should also be noted that the terms "comprises," "comprising," or any other variation thereof are intended to cover a non-exclusive inclusion, such that a process, a method, an article, or a device that includes a list of elements not only includes those elements, but also includes other elements are not expressly listed or are inherent to the process, the method, the article or the device. Without further limitation, an element defined by a statement "comprises a . . . " does not exclude a presence of additional identical elements in a process, a method, an article, or a device that includes the stated element.

Each embodiment in this specification is described in a progressive manner. The same and similar parts between the various embodiments can be referred to each other. Each embodiment focuses on its differences from other embodiments. Specifically, for the system embodiment, since it is basically similar to the method embodiment, the description is relatively simple. For relevant details, please refer to the partial description of the method embodiment.

What is claimed is:

1. A label generation method comprising:

obtaining second classification reference information of a teacher model via identifying an unlabeled image by the teacher model, and obtaining first classification reference information of a student model via identifying the unlabeled image by the student model; the first classification reference information and the second classification reference information comprising detection objects of the unlabeled image and a probability of each of the detection objects in a predicted category;

determining a number of detection objects of each predicted category in the teacher model according to the second classification reference information, and determining a number of detection objects of each predicted category in the student model according to the first classification reference information;

determining a probability threshold of each predicted category according to the number of detection objects of each predicted category in the teacher model and the number of detection objects of each predicted category in the student model;

generating a pseudo label of the unlabeled image for the student model according to the second classification reference information and the probability threshold of each predicted category.

2. The method according to claim 1, wherein determining the probability threshold of each predicted category according to the number of detection objects of each predicted category in the teacher model and the number of detection objects of each predicted category in the student model comprises:

determining a learning rate of each predicted category according to the number of detection objects of each predicted category in the teacher model and the number of detection objects of each predicted category in the student model;

determining the probability threshold of each predicted category according to the learning rate of each predicted category.

3. The method according to claim 2, wherein determining the learning rate of each predicted category according to the number of detection objects of each predicted category in the teacher model and the number of detection objects of each predicted category in the student model comprises:

determining a first proportion of detection objects of each predicted category according to a ratio between the number of detection objects of each predicted category in the teacher model and a first total number of the detection objects, the first total number of detection objects representing a sum of the number of detection objects of each predicated category in the teacher model;

determining a second proportion of detection objects of each predicted category according to a ratio between the number of detection objects of each predicted category in the student model and a second total number of detection objects, the second total number of detection objects representing a sum of the number of detection objects of each predicated category in the student model;

determining the learning rate of each predicted category according to a ratio between the first proportion of detection objects and the second proportion of detection objects.

4. The method of claim 2, wherein determining the probability threshold of each predicted category according to the learning rate of each predicted category comprises:

determining a maximum learning rate from the learning rates;

determining a weight coefficient of each predicted category according to a ratio between the learning rate and the maximum learning rate;

determining the probability threshold of each predicted category according to a product of the weight coefficient and a preset probability upper limit value.

5. The method according to claim 1, wherein determining the number of detection objects of each predicted category in the teacher model according to the second classification reference information, and determining the number of detection objects of each predicted category in the student model according to the first classification reference information comprises:

determining the predicted category of a maximum probability as a predicted category of each detection object corresponding to the teacher model, and determining the number of detection objects of each predicted category in the teacher model according to the predicted category of each detection object corresponding to the teacher model;

determining the predicted category of the maximum probability as the predicted category of each detection object corresponding to the student model, and determining the number of detection objects of each predicted category in the student model according to the predicted category of each detection object corresponding to the student model.

6. The method according to claim 5, comprising:

in response that the predicted category of each detection object corresponding to the teacher model is greater than the probability threshold of the predicted category, generating the pseudo label of the unlabeled image for the student model according to the predicted category of each detection object corresponding to the teacher model.

7. An image classification method, comprising:

identifying an image to be processed by a target model of an image classification model, and obtaining classification reference information of the target model;

determining a detection object comprised in the image to be processed and a category of the detection object according to the classification reference information of the target model;

wherein the image classification model is a model with a semi-supervised object detection framework, and the image classification model comprises a teacher model and a student model, the target model comprises the teacher model and/or the student model;

the image classification model is obtained by training according to target classification reference information of a labeled image in an image collection, target classification reference information of an unlabeled image in the image collection, a category label of the labeled image and a pseudo label of the unlabeled image; the target classification reference information of the labeled image is obtained via identifying the labeled image by the student model of the image classification model, and the target classification information of the unlabeled image is obtained via identifying the unlabeled image by the student model; the pseudo label of the unlabeled image is determined according to the method described in claim 1.

8. An electronic device, comprising:

a processor; and a storage device storing instructions, which when executed by the processor, cause the processor to;

obtain second classification reference information of a teacher model via identifying an unlabeled image by the teacher model, and obtain first classification reference information of a student model via identifying the unlabeled image by the student model; the first classification reference information and the second classification reference information comprising detection objects of the unlabeled image and a probability of each of the detection objects in a predicted category;

determine a number of detection objects of each predicted category in the teacher model according to the second classification reference information, and determine a number of detection objects of each predicted category in the student model according to the first classification reference information;

determine a probability threshold of each predicted category according to the number of detection objects of each predicted category in the teacher model and the number of detection objects of each predicted category in the student model; and generate a pseudo label of the unlabeled image for the student model according to the second classification reference information and the probability threshold of each predicted category.

9. The electronic device according to claim 8, wherein the processor determines the probability threshold of each predicted category according to the number of detection objects of each predicted category in the teacher model and the number of detection objects of each predicted category in the student model by:

determining a learning rate of each predicted category according to the number of detection objects of each predicted category in the teacher model and the number of detection objects of each predicted category in the student model; and determining the probability threshold of each predicted category according to the learning rate of each predicted category.

10. The electronic device according to claim 9, wherein the processor determines the learning rate of each predicted category according to the number of detection objects of each predicted category in the teacher model and the number of detection objects of each predicted category in the student model by:

determining a first proportion of detection objects of each predicted category according to a ratio between the number of detection objects of each predicted category in the teacher model and a first total number of the detection objects, the first total number of detection objects representing a sum of the number of detection objects of each predicated category in the teacher model;

determining a second proportion of detection objects of each predicted category according to a ratio between the number of detection objects of each predicted category in the student model and a second total number of detection objects, the second total number of detection objects representing a sum of the number of detection objects of each predicated category in the student model; and determining the learning rate of each predicted category according to a ratio between the first proportion of detection objects and the second proportion of detection objects.

11. The electronic device of claim 9, wherein the processor determines the probability threshold of each predicted category according to the learning rate of each predicted category by:

determining a maximum learning rate from the learning rates;

determining a weight coefficient of each predicted category according to a ratio between the learning rate and the maximum learning rate;

determining the probability threshold of each predicted category according to a product of the weight coefficient and a preset probability upper limit value.

12. The electronic device according to claim 8, wherein the processor determines the number of detection objects of each predicted category in the teacher model according to the second classification reference information, and determine the number of detection objects of each predicted category in the student model according to the first classification reference information by:

determining the predicted category of a maximum probability as a predicted category of each detection object corresponding to the teacher model, and determining the number of detection objects of each predicted category in the teacher model according to the predicted category of each detection object corresponding to the teacher model;

determining the predicted category of the maximum probability as a predicted category of each detection object corresponding to the student model, and determining the number of detection objects of each predicted category in the student model according to the predicted category of each detection object corresponding to the student model.

13. The electronic device according to claim 12, wherein the processor is further caused to:

in response that the predicted category of each detection object corresponding to the teacher model is greater than the probability threshold of the predicted category, generate the pseudo label of the unlabeled image for the student model according to the predicted category of each detection object corresponding to the teacher model.

* * * * *